Patented July 6, 1965

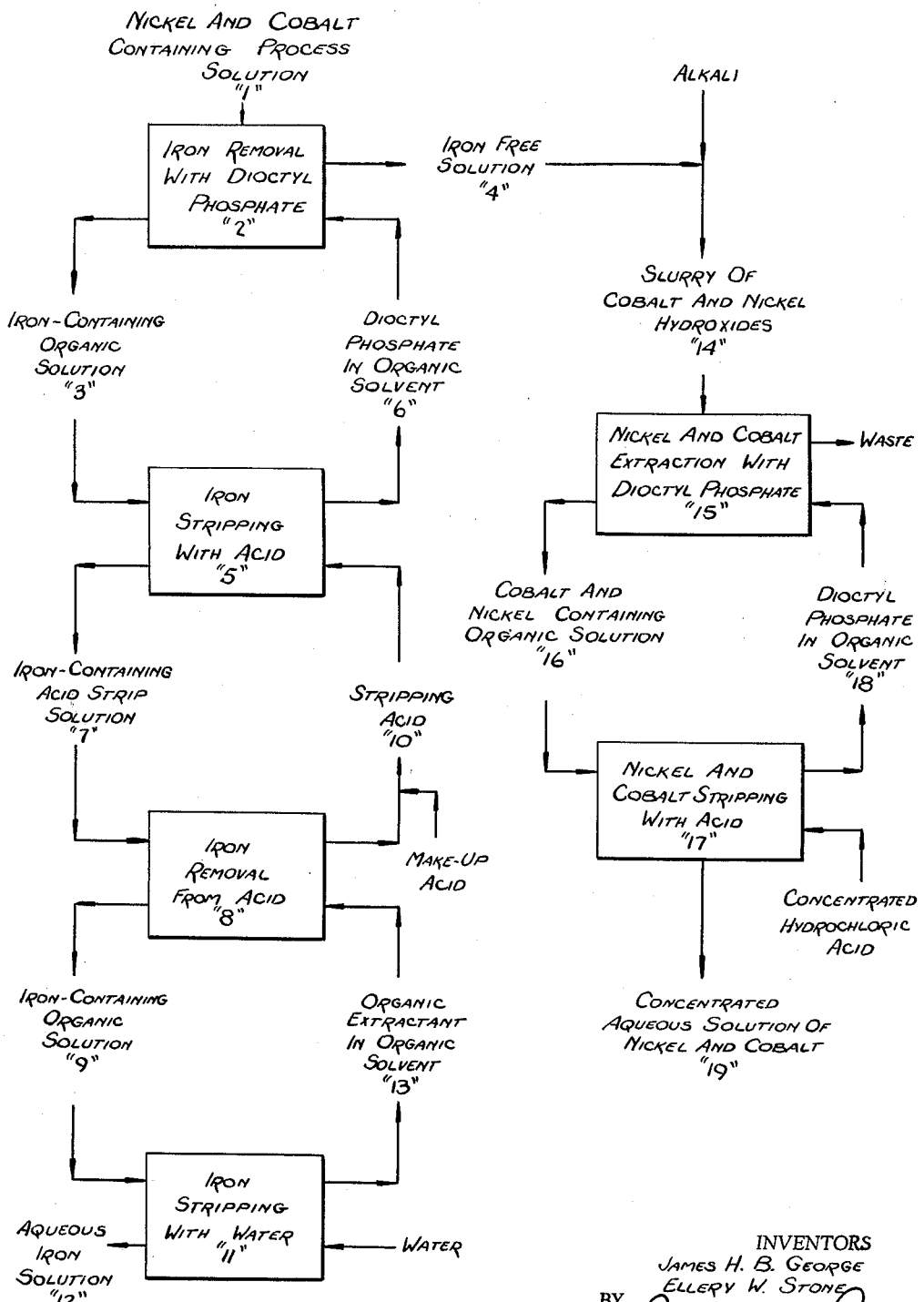

3,193,381
PROCESS FOR THE CONCENTRATION OF NICKEL AND COBALT IN AQUEOUS SOLUTIONS
James H. B. George, Cambridge, and Ellery W. Stone, Brookline, Mass., assignors, by mesne assignments, to The International Nickel Company, Inc., New York, N.Y., a corporation of Delaware
Filed Mar. 19, 1962, Ser. No. 180,444
16 Claims. (Cl. 75—108)

The present invention relates to the concentration of metals in aqueous solutions by a novel solvent extraction technique, and more particularly, to a process for concentrating nickel and cobalt values from dilute solutions.

Many attempts have been made to concentrate metal values in dilute aqueous solutions in order to allow economical recovery of these metals by further processing. Such dilute solutions usually originate from the treatment of low grade ores, such as oxide ores containing iron, nickel, cobalt and chromium, by various aqueous leaching techniques. After the metals have been leached from the low grade ores, concentration of the metal values in the dilute solutions formed has been accomplished by evaporation, ion exchange or precipitation before further processing for metal recovery. These concentrating techniques have usually proven to be so costly as to make processing of the ores for metal recovery economically unattractive. This concentration of metal values in aqueous leach solutions has been one of the problems confronting those treating the low grade laterite-type ores found in large deposits throughout the world such as in New Caledonia, the United States, Greece and the Dominican Republic. In treating these low grade ores by leaching techniques further difficulties are experienced in the selective precipitation of iron from solutions containing metals such as nickel and cobalt. Thus, when iron is precipitated as hydroxide, the precipitate is generally difficult to filter and contains significant amounts of coprecipitated nickel and cobalt.

Solvent extraction, with its great versatility, has recently offered possibilities for the solving of many metal separation and recovery problems. Many of the solvent extraction processes which have been developed for the recovery of metal values suffer from excessive costs due mostly to expensive reagents required and/or excessive consumption of reagent during processing.

Development of a method for concentrating metal values in aqueous solution which combines the features of high recovery, simplicity and economic feasibility is highly desirable.

Although many attempts were made to overcome the foregoing difficulties and other difficulties, none, as far as we are aware, was entirely successful when carried into practice commercially on an industrial scale.

It has now been discovered that aqueous solutions of nickel and/or cobalt salts can be successfully and economically concentrated up to the limit of their solubility by a novel solvent extraction process involving the use of an alkyl phosphoric acid followed by stripping with acid to form a highly concentrated solution of the salts of these metals. The present invention is particularly advantageous in that iron present in the ferric state in the dilute aqueous solution can first be removed with the same solvent extractant.

It is an object of the present invention to provide a process for highly concentrating dilute aqueous solutions of nickel and/or cobalt salts.

Another object of the invention is to provide a novel method for treating process solutions of nickel and/or cobalt to concentrate to a high degree the metal values contained therein.

The invention also contemplates providing an economically feasible, continuous, plant scale process for treating aqueous process streams containing nickel and/or cobalt obtained from the leaching of low grade ores to concentrate the nickel and/or cobalt values contained therein.

It is a further object of the invention to provide a novel solvent extraction process for removing iron impurity from aqueous process solutions containing nickel and/or cobalt and for concentrating the remaining metal values in those solutions.

The invention further contemplates providing a novel process for obtaining a concentrated aqueous solution of nickel and cobalt salts substantially completely free of iron from an iron contaminated dilute aqueous solution of these salts.

Other objects and advantages will become apparent from the following description taken in conjunction with the accompanying drawing which depicts a block flow diagram of a series of operations comprising an illustrative embodiment of the present novel solvent extraction process in which, after iron is removed from nickel- and/or cobalt-containing process solutions, the nickel and cobalt values in aqueous solution are highly concentrated, even up to the limit of solubility of the nickel and cobalt salts in aqueous solution.

Generally speaking, the present invention contemplates subjecting dilute solutions containing nickel and/or cobalt values to solvent extraction with a water-insoluble alkyl orthophosphate or alkyl pyrophosphate to highly concentrate the nickel and cobalt values in aqueous solution, e.g., up to one hundred fold each or more. Any iron contamination, present as ferric iron in the process solution, is advantageously first eliminated, if desired, by the same organic extractant as is used for concentrating the nickel and cobalt values. The organic phosphate extractant is dissolved in a water immiscible organic solvent such as a paraffin, including heptane or a naphtha.

In treating nickel- and cobalt-containing process solutions for iron elimination, iron present in the ferric state can be removed, if desired, down to negligible quantities using the alkyl phosphate extract at a starting pH of the aqueous process stream of between about 0.5 and about 2. Ferric iron can be removed to this extent by a single stage extraction step but in treating a process solution containing appreciable amounts of iron and/or free acid, a two-stage counter-current extraction is found to be advantageous. Any ferrous iron present is not appreciably removed by the extractant but is, of course, easily oxidized to the ferric state, if desired. The iron-containing organic phase and substantially iron-free (ferric iron-free), nickel- and/or cobalt-containing aqueous solution are separated and the organic phase is stripped of its iron content using a strong acid or sodium hydroxide while at the same time regenerating the alkyl phosphate extractant for re-use.

The substantially iron-free process solution is neutralized with a strong alkali such as sodium hydroxide or potassium hydroxide. Sufficient alkali is used to neutralize the free acid and precipitate nickel and cobalt hydroxides. Not more than about 1.15 equivalents of alkali per equivalent of nickel plus cobalt present in solution plus the amount of alkali needed to neutralize the free acid in solution should be used, however, since amounts above this ratio result in emulsification in the subsequent solvent extraction. Enough alkali is added, however, in stoichiometric amounts to precipitate the amount of nickel and cobalt which it is desired to remove from the dilute solution. Any nickel and cobalt not precipitated as hydroxides would not be taken up by the organic extractant subsequently added. The alkyl phosphate extractant is then added to the aqueous slurry and takes up almost all of the nickel and cobalt values into an organic phase leaving an aqueous solution consisting of a dilute alkali metal salt solution which goes to waste.

The organic phase containing nickel and cobalt is stripped with concentrated hydrochloric acid to form a highly concentrated nickel- and cobalt-containing aqueous solution. At the same time the alkyl phosphate extractant is regenerated for recycle. By using 12 N hydrochloric acid aqueous solutions containing up to about 100 grams per liter each of both nickel and cobalt can be obtained. Metal concentrations obtainable are, as a practical matter, limited only by the solubility of the final nickel and/or cobalt salt formed. Use of more dilute acid results, of course, in formation of more dilute solutions of nickel and/or cobalt.

The solvent extraction operations described herein may be carried out in any extraction apparatus well known to those skilled in the art such as stripping towers, mixer-settlers and centrifugal extractors. It has been found that use of centrifugal equipment allows a more rapid liquid-liquid separation.

Referring to the drawing which sets forth a block flow diagram of an illustrative embodiment of the herein-described novel process, in which embodiment iron is stripped from the alkyl phosphate extractant with a strong acid, a nickel- and/or cobalt-containing process solution "1" containing iron impurities is treated in iron removal operation "2" with a water-insoluble alkyl orthophosphate or pyrophosphate, e.g., di-2-ethylhexyl phosphoric acid, hereinafter referred to as dioctyl phosphate or DOP, dissolved in a water-immiscible organic solvent, to remove any iron present in the ferric state. In operation "2" an organic solution "3" containing substantially all the ferric iron as an organic complex and, if all the iron was present in the ferric state, a substantially iron-free nickel- and cobalt-containing aqueous solution "4" are formed. Any ferrous iron present is not extracted with the ferric iron but is precipitated as a hydroxide and is extracted with the nickel and cobalt in the subsequent nickel and cobalt extraction step.

Organic solution "3" is treated in iron stripping operation "5" with concentrated acid to remove the iron and regenerate the dioctyl phosphate in organic solvent "6" for re-use in further ferric iron removal. The acid used for iron stripping advantageously should be recovered for re-use to improve the economics of the process. This is accomplished in iron removal operation "8" by means of anionic solvent extraction or anion exchange techniques using organic extractants, such as Aliquat reagent, a long-alkyl-chain quaternary ammonium chloride made by General Mills Inc., or by using LA-2 reagent, a long-chain secondary amine made by Rohm & Haas, or by passage through an anion exchange resin such as IRA-400 resin made by Rohm & Haas. By operation "8" the iron is removed from the acid in an iron-containing organic solution "9" leaving the stripping acid "10" for recycle to operation "5." As shown in the block flow diagram, make-up acid may be added to the regenerated acid "10" to allow for acid loss to the organic phase in operation "5."

The organic extractant used in operation "8" is best recovered from iron-containing organic solution "9" by stripping with water in operation "11" during which the organic extractant in organic solvent "13" is regenerated for re-use in iron removal step "8." At the same time iron is removed from the organic solution in aqueous iron solution "12." Although the block flow diagram shows iron as being stripped from the dioctyl phosphate reagent in operation "5" with acid, advantageously the iron may be stripped by treating iron-containing organic solution "3" with sodium hydroxide to remove all the iron as ferric hydroxide and regenerate the dioctyl phosphate in organic solvent solution "6." The ferric hydroxide can be processed for iron recovery or drawn off to waste.

The nickel- and cobalt-containing iron-free solution "4" is treated for concentration of its nickel and cobalt values by the dioctyl phosphate organic extractant. This solution, which is at a pH of the order of 1 because of acidity generated during the iron extraction process, is treated with a strong alkali, e.g., sodium hydroxide. Alkali slightly in excess of the amount sufficient to neutralize the free acid and precipitate the nickel and cobalt as hydroxides is added. The slurry of nickel and cobalt hydroxides "14" is treated in nickel and cobalt extraction operation "15" with dioctyl phosphate in an organic solvent "18" to extract all the nickel and cobalt and some alkali into organic solution "16." Any ferrous iron present in solution is also extracted at this stage. The aqueous phase remaining, a dilute salt solution, is removed from the organic phase and run off to waste.

The organic solution "16" is treated in nickel and cobalt stripping operation "17" with a volume of concentrated hydrochloric acid stoichiometrically equivalent to the nickel, cobalt and alkali contained in the dioctyl phosphate extractant. This causes complete transfer of the metals to the aqueous phase, neutralization of the alkali and regeneration of the dioctyl phosphate reagent in the organic solvent "18" for re-use in nickel and cobalt extraction operation "15." The final concentration of chloride in the aqueous solution of nickel and cobalt "19" is somewhat lower than in the acid used because of water formed in neutralizing the alkali. Concentration of both nickel and cobalt in solution may be as high as 100 grams per liter each or higher, depending on the mutual solubilities of nickel and cobalt chlorides at the operating temperatures used. This concentrated nickel- and cobalt-containing solution can be further treated for separation of the nickel and cobalt and recovery of these metals therefrom.

In carrying the invention into practice, it is found that dilute aqueous solutions of nickel and/or cobalt may in a two-step process be concentrated up to the order of one hundred fold by extracting the nickel and cobalt values with a water-insoluble alkyl orthophosphate or alkyl pyrophosphate in an organic solvent followed by stripping the nickel and cobalt from the organic phase with concentrated hydrochloric acid. In cases where the original nickel- and cobalt-containing aqueous solutions contain iron impurities, advantageously the iron may be first removed using the same organic extractant and advantageously, a two-stage extraction operation.

Dioctyl phosphate has been found the most effective of the water-insoluble alkyl orthophosphates or alkyl pyrophosphates for extracting iron, nickel and cobalt because of its very low solubility in water, an important requirement for the commercial feasibility of the process. For purposes of describing the invention but not to limit it, we shall hereinafter refer to the use of dioctyl phosphate as the organic extractant utilized. An advantageous water-immiscible organic solvent for the DOP reagent has been found to be Skellysolve C solvent, a commercial solvent prepared by Skelly Oil Company, which is largely n-heptane. Other water-immiscible solvents such as paraffins, naphthas and halogenated hydrocarbons may be utilized for making up the extractant solutions. When ferric iron is removed from the feed solution by solvent extraction prior to concentrating cobalt and/or nickel, it is preferable to use the same solvent in both extraction circuits since solvent loss is reduced when the nickel and cobalt solution becomes saturated with solvent during ferric iron removal before further treatment for nickel and cobalt extraction.

Dilute aqueous acidic solutions of nickel and/or cobalt are treated with sufficient strong alkali, e.g., sodium hydroxide or potassium hydroxide, to neutralize any acid and precipitate advantageously all the nickel and cobalt present as hydroxides. The resulting slurry is then treated with DOP extractant which causes an almost complete uptake of the metals into the organic phase, forming a deep blue solution. The organic phase is separated from the nickel- and cobalt-free aqueous phase and is stripped of its nickel and cobalt values with concentrated hydrochloric acid to yield a concentrated cobalt-nickel chloride solution. The nickel and cobalt in this concentrated solution can then be separated, advantageously by further organic extraction techniques.

Two significant variables affect the extent of extraction of nickel and cobalt into the DOP reagent. Thus, it has been found that (a) the ratio of added sodium hydroxide to total nickel and cobalt and (b) the ratio of added DOP to total nickel and cobalt is important in establishing optimum conditions for extraction. Greater extraction is obtained at higher alkali-to-metal ratios but at lower DOP-to-metal ratios. This seeming paradox of greater extraction at lower DOP-to-metals ratios is due to the acidity of the DOP extractant, which tends to repress the uptake of metal. There is an upper limit to the amount of sodium hydroxide that can be added as emulsification occurs at sodium hydroxide-to-metals ratios above about 1.15:1. Note that the alkali referred to in describing alkali-to-metals ratios herein is the alkali used in excess of that equivalent to and used to neutralize any free acid in solutions being treated. Advantageous conditions for the nickel and cobalt extraction, as shown by the test results in Tables I and II, hereinafter, have been found to be an equivalent of alkali to equivalent of nickel and cobalt ratio of between 0.9:1 and 1.15:1 and an equivalent of DOP to equivalent of nickel and cobalt ratio of between 0.7:1 and 0.9:1. Optimum condition as shown by these results are an alkali ratio of 1.14:1 and a DOP ratio of the order of 0.81.

Tables I and II show the effect on nickel and cobalt extraction, using DOP extractant, of varying the equivalent of sodium hydroxide to equivalent of nickel and cobalt ratios and of varying the equivalent of DOP to equivalent of nickel and cobalt ratios. Each of the tests was a single-stage extraction conducted on an aqueous solution containing 1.37 grams per liter of cobalt, 1.25 grams per liter of nickel and containing hydrochloric acid with a concentration of 0.135 M. Various volumes of 0.612 M sodium hydroxide were added in the tests to precipitate nickel and cobalt hydroxides and various volumes of 1.06 M DOP in Skellysolve C solvent were added to take up nickel and cobalt. The aqueous to organic volume phase ratios for these tests were between 15.4 and 19.6. Tables I and II show the nickel concentration and cobalt concentration, respectively, in grams per liter of the aqueous phase after each extraction.

*Table I*

| eq DOP/eq Co+Ni | eq NaOH/eq Ni+Co | | |
|---|---|---|---|
| | 0.760 | 0.945 | 1.14 |
| | Equilibrium aqueous Ni concentration (grams/liter) | | |
| 0.75 | 0.22 | 0.042 | 0.002 |
| 0.80 | 0.33 | 0.045 | 0.002 |
| 0.85 | 0.375 | 0.112 | 0.0112 |

NOTE.—eq=equivalent.

*Table II*

| eq DOP/eq Co+Ni | eq NaOH/eq Ni+Co | | |
|---|---|---|---|
| | 0.760 | 0.945 | 1.14 |
| | Equilibrium aqueous Co concentration (grams/liter) | | |
| 0.75 | 0.121 | 0.0315 | 0.0071 |
| 0.80 | 0.153 | 0.0294 | 0.0068 |
| 0.85 | 0.161 | 0.053 | 0.0089 |

By the results of the tests shown in Tables I and II it can be seen that DOP is an excellent extractant for nickel and cobalt in aqueous solution since in all these single-stage extractions only minor amounts of nickel and cobalt were left in the aqueous phase.

Under the optimum conditions described hereinbefore, 99.3% of the cobalt and 99.8% of the nickel are extracted into the DOP in one stage. Using the same optimum ratios of NaOH and DOP to nickel and cobalt in a second and separate extraction stage to remove a further quantity of nickel and cobalt from the aqueous phase results in total extraction for the two stages of 99.8% of the cobalt and over 99.9% of the nickel.

The DOP organic phase containing nickel and/or cobalt can be completely stripped of its nickel and cobalt values using hydrochloric acid. More concentrated solutions of nickel and cobalt result, of course, from use of concentrated hydrochloric acid (12 N). The stripping of the nickel and cobalt loaded organic solution is a unique operation in that complete stripping to give very highly concentrated aqueous solutions can be obtained in one step. Although some water forms from neutralization of excess alkali, e.g., sodium hydroxide, contained in the organic phase, with resultant dilution of the aqueous phase, final concentrations of both nickel and cobalt in the order of 100 grams per liter can be obtained.

To illustrate this markedly high concentration combined with complete metal stripping in treating loaded DOP reagent, an organic solution of DOP containing 16.7 and 14.6 grams per liter of cobalt and nickel, respectively, obtained from a dilute solution containing 1 gram per liter each of both nickel and cobalt, was treated with concentrated (12 N) hydrochloric acid at an aqueous to organic volume phase ratio of 1 to 8.65. At equilibrium the DOP organic phase contained no detectable cobalt or nickel whereas the aqueous phase, even though it had increased by about one-third in volume from the formation of water due to the neutralization of sodium hydroxide, contained 105 and 95.5 grams per liter of cobalt and nickel, respectively, i.e., a concentration of the order of one hundred times the concentration in the original process solution treated.

As can be seen by the test results tabulated hereinbefore, by using the aforedescribed organic and acid stripping techniques, dilute solutions containing nickel and/or cobalt can be concentrated in the order of one hundred fold each by a two-stage organic extraction followed by a single stripping stage with concentrated acid. Strong acids other than hydrochloric may be utilized for stripping of cobalt and nickel and regeneration of DOP reagent. Thus, sulfuric, nitric and perchloric acids may be used with formation of concentrated sulfate, nitrate and perchlorate solutions of nickel and cobalt, respectively. Use of hydrochloric acid is advantageous, however, in that subsequent separation of nickel and cobalt is more easily accomplished with the chlorides.

Different ratios of alkali to nickel and cobalt and of organic extractant to nickel and cobalt from those optimum figures described hereinbefore may be utilized, of course, with merely more extraction steps being necessary to obtain the same extent of nickel and cobalt extraction from the dilute solutions being treated. Solution concentrations of between about 0.5 M and about 2 M of DOP organic extractant are found to be advantageous with concentrations below this range resulting in lowering of extraction efficiency and the need of an excessive number of extraction steps and concentrations above this range resulting in quite high viscosity of the organic solution with viscosity increasing as concentrations rise above in the order of one molar.

As aforementioned, one of the attractive features of the hereindescribed novel process for concentrating metals in aqueous solution is that iron, if present, may be first removed in the ferric state using the same alkyl orthophosphate or alkyl pyrophosphate organic extractant. Ferrous iron is not removed with the ferric iron so that if it is desired to remove all iron from solution before concentration of nickel and cobalt it must be all oxidized to the ferric state. The iron-containing solution is treated at a pH of between about 0.5 and about 2 with the organic alkyl phosphate extractant. Advantageously, the pH of the starting solution should be between about 1 and 2 since at a pH approaching 0 the extraction is noticeably poorer, and at a pH of above about 2 nickel and cobalt are increasingly extracted. Table III shows the effect on ferric iron extraction of varying the initial pH of a solution containing 2.11 grams per liter of iron in the ferric state and 1 gram per liter each of nickel and cobalt. Each test was a single-stage extraction using 25 milliliters of aqueous solution and 25 milliliters of organic solution consisting of 0.2 M DOP extractant in Skellysolve C organic solvent. It is to be noted from the figures in Table III that extraction efficiency in these tests was quite low since a relatively dilute solution of DOP (only 0.2 M) was utilized. Due to the release of hydrogen ion during the ferric extraction, the pH of the solution drops noticeably during ferric iron removal.

*Table III*

| Initial pH | Concentration of iron in aqueous phase at equilibrium, grams/liter | Concentration of iron in organic phase at equilibrium, grams/liter |
|---|---|---|
| 0.1 | 0.60 | 1.51 |
| 1.1 | 0.161 | 1.95 |
| 2.0 | 0.132 | 1.98 |

In extracting ferric iron with DOP extractant it has been found that uptake of iron into the organic phase is very rapid as long as there are more than about six gram-molecules of extractant in the organic phase to every one gram-atom of iron. As soon as the amount of iron in the DOP phase increases beyond this point, the uptake of iron is much less marked. This effect is well illustrated by the results of tests shown in Table IV, following. In treating an aqueous solution containing of the order of 2 grams per liter of iron it has been found that 1 M DOP (323 grams/liter) can be utilized with an aqueous to organic volume phase ratio of about 4:1 to remove iron from the solution down to less than 0.1 part per million in a two-stage stripping operation with the DOP organic phase being loaded to a level of about 8 grams per liter in the first extraction stage. As can be seen by the test results in Table IV following, it is possible to load 1 M DOP to about 9 grams per liter of iron in one extraction stage leaving negligible iron in the aqueous phase at an aqueous to organic volume phase ratio of about 5:1 when treating solutions containing about 2 grams per liter of iron. When more dilute solutions of DOP extractant are used, in order to remove substantially all iron from solutions containing similar amounts of iron, it is necessary to use more extraction stages or a lower aqueous to organic volume ratio or both as shown by the test results in Table IV. Extraction of iron from solutions containing greater quantities of this metal in the ferric state requires use of lower aqueous to organic volume ratios, as also shown by the test results in Table IV, or more extraction stages or both.

Table IV shows the results of single stage extractions of ferric iron from solutions containing varying amounts of iron and using different concentrations of DOP organic extractant in Skellysolve C solutions at different aqueous to organic volume phase ratios. The number of gram-molecules of DOP extractant used per gram-atom of ferric iron present in the organic phase at equilibrium is shown for each one of these single stage tests. The initial pH of the aqueous solution for each of these tests varied between 1.6 and 1.8.

*Table IV*

| Initial solutions | | | | Final solutions | | Gram-molecules of DOP per gram-atom of iron |
|---|---|---|---|---|---|---|
| Organic | | Aqueous | | Iron in organic (mg./ml.) | Iron in aqueous (mg./ml.) | |
| Molarity of DOP | Volume (ml.) | Volume (ml.) | Iron in solution (mg./ml.) | | | |
| 1 | 25 | 25 | 3.8 | 3.8 | 0.0004 | 14.8 |
| 1 | 25 | 50 | 1.9 | 3.8 | 0.0005 | 14.8 |
| 1 | 25 | 25 | 5.7 | 5.7 | 0.0009 | 9.8 |
| 1 | 25 | 25 | 7.6 | 7.5 | 0.062 | 7.5 |
| 1 | 11 | 50 | 1.9 | 8.6 | 0.003 | 6.5 |
| 0.5 | 20 | 50 | 1.8 | 4.5 | 0.005 | 6.2 |
| 1 | 10 | 50 | 1.8 | 9.0 | 0.006 | 6.2 |
| 0.2 | 20 | 20 | 1.85 | 1.8 | 0.052 | 6.2 |
| 1 | 25 | 25 | 9.4 | 9.3 | 0.128 | 6.0 |
| 1 | 9 | 50 | 1.9 | 9.9 | 0.126 | 5.7 |
| 1 | 7 | 50 | 1.9 | 11.8 | 0.250 | 4.8 |
| 0.5 | 11 | 50 | 1.8 | 6.1 | 0.460 | 4.6 |
| 0.2 | 10 | 20 | 1.85 | 2.8 | 0.456 | 4.0 |
| 1 | 5 | 50 | 1.9 | 13.9 | 0.505 | 4.0 |

NOTE.—ml.=milliliters. mg./ml.=milligrams per milliliter.

Stripping of iron from the organo complex with DOP with simultaneous regeneration of the DOP can be accomplished by using concentrated acid or caustic soda. The most advantageous procedure is to remove the iron as ferric hydroxide from the DOP by using sodium hydroxide. The organic DOP solution can then be recycled for further iron removal from aqueous solutions being treated. Removal of iron using caustic soda proceeds quantitatively leaving the DOP organic extractant free of iron and ready for direct re-use. It has been found that caustic soda in an amount of at least 40% above that required to quantitatively precipitate the iron present must be used or else poor phase separation and/or incomplete stripping will result. After precipitating the iron and separating the aqueous and organic phases, this excess caustic soda can, if desired, be reused for further iron stripping.

To illustrate the advantageous results obtained in stripping iron from DOP using caustic soda, various volumes of solutions containing 0.5 M, 1 M and 2 M sodium hydroxide were shaken with 10 milliliters of iron-loaded DOP extractant. Phase ratios were chosen to provide mole ratios of caustic soda to DOP of between 1 and 1.6. At all three concentrations of sodium hydroxide the use of less than a 40% excess of sodium hydroxide resulted in poor phase separation and/or incomplete stripping. The 0.5 M solution caused emulsification, and the 2 M solution provided too little aqueous phase to completely cover the precipitated ferrite hydroxide. Optimum conditions were found to be with the use of between 1.4 and 1.6 moles of base per mole of DOP with the base consisting of a 1 M solution of sodium hydroxide. With these conditions stripping was found to be complete and phase separation satisfactory after centrifugation of the slurry.

It is to be noted that when caustic soda is used for stripping iron from the DOP, the DOP is regenerated in the sodium form. If necessary, by treating with acid the DOP can be transformed back to the acid form.

Iron may also be stripped from the complex with DOP by using acid. Use of concentrated acid has been found to be necessary in obtaining an effective stripping of iron. Stripping with acid must be carried out by a multi-stage technique. Concentrated hydrochloric acid is found to be effective with 7 N hydrochloric being optimum, this normality being more effective than both lower and higher concentrations. A three-stage stripping with 7 N hydrochloric acid has been found to reduce the concentration of iron in a DOP organic phase containing 8 grams per liter of iron to 0.2 gram per liter. Sulfuric acid alone or nitric acid alone have been found to be ineffective in stripping although the addition of sodium chloride has been found to improve the effectiveness of sulfuric acid for stripping purposes.

Acid loss to the organic phase during the iron stripping operation is an important factor and it has been found that a sulfuric-hydrochloric acid mixture is effective in stripping iron from the complex with DOP with acid loss to the organic phase being lower than with pure hydrochloric acid. A mixture of 4 N sulfuric and 3 N hydrochloric to 3 N sulfuric and 4 N hydrochloric acids is most advantageously utilized in the stripping operation, the acid loss to a 1 M DOP organic solution amounting to about 17 pounds of hydrochloric acid and about 28 pounds of sulfuric acid per 1000 pounds of iron stripped with a mixture of 4 N sulfuric and 3 N hydrochloric acids. This compares with about 74 pounds of acid loss to a 1 M DOP solution per 100 pounds of iron stripped when using 7 N hydrochloric acid alone.

Table V illustrates the effectiveness of various acids and mixtures of acids for stripping iron from 1 M DOP in Skellysolve C containing various iron loadings. The results of tests using various concentrations of hydrochloric acid, sulfuric acid, mixtures of sulfuric acid and sodium chloride and mixtures of sulfuric and hydrochloric acids are shown in Table V. Each of these tests was a one-stage stripping operation and in each case the final aqueous and organic solutions were analyzed for iron at equilibrium.

In these tests 97%, 100% and 94%, respectively, of the iron was stripped from the iron-DOP solutions. Iron can be removed from the EDTA solution by precipitation with sodium hydroxide. In using EDTA, however, there is found to be a considerable increase in the volume of the organic phase, probably caused by uptake of EDTA. Because of this complication in the EDTA procedure, use of sodium hydroxide or acid for stripping is found to be more advantageous.

In using acid as aforedescribed for stripping iron from the iron-DOP complex, it has been found to be economical to remove the iron from the acid strip solution and return the acid for recycle. The chloride concentration in either the hydrochloric or the mixed hydrochloric-sulphuric solutions is great enough to hold the iron as a chloranion thus allowing removal of the iron by anionic solvent extraction and by any strong base anion exchange material. For example, iron may be extracted from the hydrochloric acid and the mixed sulfuric acid-hydrochloric acid stripping solutions using either Aliquat chloride reagent, a long-alkyl-chain quaternary ammonium chloride, or LA–2 reagent, a long-chain secondary amine. In treating 7 N hydrochloric acid containing 9.4 grams per liter of iron with equal volumes of 0.5 M LA–2 reagent in xylene, in one extraction the iron in the aqueous acid solution was reduced to 0.075 gram per liter. Use of equal volumes of 0.5 M Aliquat chloride reagent in Skellysolve C containing 10% of tridecyl alcohol on the same iron-containing acid solution reduced the iron content of the acid solution in one extraction to 0.006 gram per liter. LA–2 reagent is made more attractive by the tendency of Aliquat chloride reagent to split into two phases at high iron loadings. Use of LA–2 reagent is also more advantageous in that acid loss to this extractant is less than that to Aliquat chloride reagent, being in the order of 70 pounds of hydrochloric acid compared with in the order of 150 pounds of hydrochloric acid for the latter extractant per 100 pounds of iron removed.

Although removal of iron from the mixed sulfuric-hydrochloric stripping acid with Aliquat chloride reagent proceeds readily, the process is rendered unsatisfactory by the considerable exchange which takes place between the sulfate ion and the chloride of the extractant. LA–2 reagent can be used advantageously for stripping ion from the mixed acid. In treating 4 N sulfuric-3 N hydrochloric mixed acid containing 9.8 grams per liter of iron

*Table V*

| | Initial solutions | | | Final solutions at equilibrium | | |
|---|---|---|---|---|---|---|
| Stripping solution | Acid volume (ml.) | Organic volume (ml.) | Iron in organic (mg./ml.) | Iron in aqueous (mg./ml.) | Iron in organic (mg./ml.) | Percent of iron stripped |
| 7 N HCl | 25 | 25 | 9.4 | 7.2 | 2.2 | 76 |
| 7 N HCl | 25 | 25 | 5.8 | 4.3 | 1.4 | 75 |
| 5 N HCl | 6 | 25 | 8.8 | 17.0 | 4.8 | 44 |
| 10 N HCl | 25 | 25 | 9.3 | 3.2 | 6.1 | 34 |
| 10 N HCl | 25 | 25 | 5.8 | 1.2 | 4.6 | 21 |
| 2 N HCl | 6.8 | 25 | 9.3 | 2.9 | 8.5 | 8.5 |
| 0.5 N HCl | 27.5 | 25 | 9.3 | 0.087 | 9.2 | 1.0 |
| 4 N $H_2SO_4$+3N HCl | 25 | 25 | 7.4 | 5.0 | 2.4 | 68 |
| 4 N $H_2SO_4$+3N HCl | 20 | 25 | 7.4 | 6.0 | 2.6 | 60 |
| 4 N $H_2SO_4$+3N HCl | 10 | 25 | 7.4 | 8.8 | 3.9 | 48 |
| 7 N $H_2SO_4$+3.31N NaCl | 20 | 25 | 8.0 | 5.9 | 3.3 | 59 |
| 7 N $H_2SO_4$+2.03N NaCl | 20 | 25 | 8.0 | 4.4 | 4.5 | 44 |
| 7 N $H_2SO_4$ | 20 | 25 | 8.0 | 1.1 | 7.1 | 10.9 |
| 5 N $H_2SO_4$ | 12 | 25 | 8.8 | 1.9 | 7.9 | 10.3 |
| 20 N $H_2SO_4$ | 5 | 20 | 9.4 | 0.83 | 9.2 | 2 |

Chelating agents are found to be capable of stripping iron from the DOP complex. Solutions of Versene, tetrasodium ethylenediaminetetraacetate (EDTA), have been found to be particularly effective. Iron-specific Versene could not be used since it invariably produced emulsions. Three single stage tests were conducted on 1 M DOP in Skellysolve C containing 9.4, 5.75 and 1.88 grams per liter of iron and using 0.34 M EDTA, with equal volumes of aqueous and organic starting phases.

and using a volume ratio of 0.5 M LA–2 reagent in xylene to acid solution of 5:1, in one extraction the iron in the aqueous acid solution was reduced to 0.08 gram per liter. Mixed acid loss to the LA–2 extractant is of the order of 13 pounds of hydrochloric and 34 pounds of sulfuric per 100 pounds of iron removed.

Iron can be removed from concentrated hydrochloric acid using IRA–400 anion exchange resin, but this resin is ineffective in removing iron from the mixed acid. In any case acid loss when using IRA–400 resin amounts to of the order of 415 pounds of hydrochloric acid per 100 pounds of iron removed.

The extractants used for iron removal from the stripping acids can all be regenerated by stripping the iron from the organic solutions with water. The extractant is then recycled to further treatment of iron-loaded stripping acid. It has been found that in washing 0.5 M LA–2 reagent in xylene, containing 9.3 grams per liter of iron with water using an aqueous to organic volume phase ratio of 3:1, the iron in the organic can be reduced to 0.28 gram per liter in one extraction stage. 0.5 M Aliquat chloride reagent in Skellysolve C with 10% tridecyl alcohol and containing 9.4 grams per liter of iron can be washed with water in one extraction stage down to 1.5 grams per liter using an equaous to organic volume phase ratio of 3:1. 25 liters of IRA–400 resin loaded with 1690 grams of iron can be completely eluted of iron with in the order of 95 liters of water.

For the purpose of giving those skilled in the art a better understanding of the present invention, an example of the novel combination of operations illustrated by the flowsheet in the accompanying drawing is given hereinafter:

A nickel- and cobalt-containing chloride process solution "1" containing 1.0 gram per liter of nickel, 1.0 gram per liter of cobalt and 2.0 grams per liter of iron in the ferric state at a pH of 2 was treated with 1 M dioctyl phosphate (DOP) in iron removal operation "2." A two-stage countercurrent extraction using an aqueous to organic volume phase ratio of 3.89:1 was used in the iron removal to form an iron-containing organic solution "3" containing 8 grams per liter of iron and a substantially iron-free aqueous solution "4" containing less than 0.1 part per million of iron. The organic solution "3" was treated in iron stripping operation "5" with 7 N hydrochloric acid in three stages using an aqueous to organic volume phase ratio of 1:1 to reduce the iron in the DOP organic phase to 0.2 gram per liter.

The regenerated dioctyl phosphate in organic solvent "6" was recycled for further iron removal in operation "2" and the acid strip solution "7" containing the iron removed from the DOP organic phase at a concentration of 8 grams per liter was treated in operation "8" for removal of iron from the acid. Iron removal from the acid was accomplished by using 0.5 M LA–2 extractant in xylene with an aqueous to organic volume phase ratio of 3:2. In a two-stage extraction the iron was substantially completely removed from the 7 N hydrochloric acid to form iron-free stripping acid "10" for recycle to operation "5" and LA–2 extractant organic solution "9" containing 12 grams per liter of iron. Solution "9" was treated in operation "11" by stripping with water for removal of the iron from the LA–2 extractant solution. In a two-stage extraction using an aqueous to organic volume phase ratio of 4:1, the iron was completely removed from the LA–2 extractant organic solution to form iron-free extractant "13" for recycle to operation "8" and aqueous iron chloride solution "12" which was run off to waste.

The substantially iron-free solution "4" containing 1 gram per liter of nickel and the same concentration of cobalt was treated with 0.6 M sodium hydroxide, using 1.14 equivalents of sodium hydroxide per equivalent of nickel and cobalt, to form a slurry of cobalt and nickel hydroxides "14." The slurry was treated with 1 M DOP in Skellysolve C in extraction operation "15" to form a cobalt- and nickel-containing organic solution "16" and an aqueous solution which went to waste. A two-stage extraction was used in operation "15" with 0.8 equivalent of DOP being utilized per equivalent of nickel and cobalt in the slurry. This amounted to an aqueous to organic phase ratio in the first stage of 17.4:1 and in the second stage of 436:1. In two-stage extraction "15," 99.9% of the nickel and 99.8% of the cobalt were removed from the aqueous slurry in organic solution "16" which contained about 17 grams per liter each of nickel and cobalt.

Solution "16" was treated with concentrated hydrochloric acid (12 N) in operation "17" to strip the nickel and cobalt from the DOP organic solution. An aqueous to organic volume phase ratio of 1 to 8.65 was employed in the acid stripping operation with complete stripping of the cobalt and nickel being attained in one step to form DOP solution "18," containing no detectable nickel or cobalt, for recycle to extraction step "15" and to form a concentrated aqueous solution of nickel and cobalt "19" containing about 110 grams per liter each of nickel and cobalt.

It is to be observed that although a di-2-ethylhexyl phosphoric acid (DOP) has been found to be the most efficient extractant for removing iron, nickel and cobalt from aqueous solution, other water insoluble alkyl orthophosphates and alkyl pyrophosphates are effective for extracting iron, nickel and cobalt from solution. Thus, mono-dioctyl orthophosphoric acid, mono-decyl orthophosphoric acid, mono-octyl orthophosphoric acid, monododecyl phosphoric acid (Dowsol 12 reagent, made by the Dow Chemical Company), Dowsol 17 reagent (also made by the Dow Chemical Company), mono-diisoamyl orthophosphoric acid, dioctyl phosphonate and 2-ethylhexyl diphenyl phosphate are all effective in varying degrees in removing iron, nickel and cobalt from aqueous solution. Dinonyl naphthalene sulfonic acid was also found to be effective in iron, nickel and cobalt removal.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for concentrating nickel and cobalt values from a dilute aqueous acidic solution of nickel and cobalt which comprises adding a strong alkali from the group consisting of sodium hydroxide and potassium hydroxide to the dilute aqueous acidic solution in an amount sufficient to precipitate substantially all the nickel and cobalt in said dilute aqueous solution as hydroxides but not more than about 1.15 equivalents of alkali in excess of that required to neutralize free acid in solution for each equivalent of nickel and cobalt in solution; treating the hydroxide slurry so formed with a solution of between about .5 M and about 2 M di-2-ethylhexyl phosphoric acid in waterimmiscible organic solvent to form a nickel- and cobaltcontaining organic phase and an aqueous phase substantially free from nickel and cobalt; separating said organic and aqueous phases; and treating said organic phase with concentrated acid to remove the nickel and cobalt from said organic phase and to form a highly concentrated aqueous solution of nickel and cobalt and to reform an organic solution of said di-2-ethylhexyl phosphoric acid for re-use in treating further hydroxide slurry.

2. A process as described in claim 1 in which the organic phase is treated with concentrated hydrochloric acid.

3. A process as described in claim 1 in which the water-immiscible organic solvent is n-heptane.

4. A process for concentrating nickel and cobalt values from a dilute aqueous acidic solution of nickel and cobalt which comprises adding a strong alkali from the group consisting of sodium hydroxide and potassium hydroxide to the dilute aqueous acidic solution at a ratio of between about 0.9 and about 1.15 equivalents of alkali in excess of that required to neutralize free acid in solution for each equivalent of nickel and cobalt in solution to precipitate the nickel and cobalt in said dilute aqueous solution as hydroxides; treating the hydroxide slurry so formed with a solution of di-2-ethylhexyl phosphoric acid in a water-immiscible organic solvent at a ratio of between about 0.7 and about 0.9 equivalent of di-2-ethylhexyl phosphoric acid for each equivalent of nickel and cobalt in solution to form a nickel- and cobalt-containing organic phase and an aqueous phase substantially free from nickel and cobalt; separating said organic and aqueous phases; and treating said organic phase with concentrated hydrochloric acid to remove the nickel and cobalt from said organic phase and to form a highly concentrated aqueous solution of nickel and cobalt and to reform a solution of said di-2-ethylhexyl phosphoric acid in a water-immiscible organic solvent for re-use in treating further hydroxide slurry.

5. A process for treating an aqueous acidic solution of at least one metal from the group consisting of nickel and cobalt to form a concentrated aqueous solution therefrom which comprises adding a strong alkali from the group consisting of sodium hydroxide and potassium hydroxide to the aqueous acidic solution in an amount sufficient to precipitate substantially all of said nickel and cobalt in said aqueous solution as hydroxide and in an amount of not more than about 1.15 equivalents of alkali in excess of that required to neutralize free acid in solution for each equivalent of nickel and cobalt in solution; treating the hydroxide slurry so formed with an organic solution comprising a compound from the group consisting of alkyl orthophosphates and alkyl pyrophosphates dissolved in a water-immiscible organic solvent to form an organic phase containing substantially all of the metal from said group consisting of nickel and cobalt and an aqueous phase substantially free from nickel and cobalt; separating said organic and aqueous phases; and treating said organic phase with concentrated acid to remove any nickel and any cobalt from said organic phase and to form a highly concentrated aqueous solution of metal from the group consisting of nickel and cobalt and to reform an organic solution of the compound from the said group consisting of alkyl orthophosphates and alkyl pyrophosphates for re-use in treating further hydroxide slurry.

6. A process as described in claim 5 in which the organic phase is treated with concentrated hydrochloric acid.

7. A process for treating an aqueous acidic solution of at least one metal from the group consisting of nickel and cobalt to form a concentrated aqueous solution therefrom which comprises adding a strong alkali to the aqueous acidic solution to precipitate said nickel and cobalt in said aqueous solution as hydroxide; treating the hydroxide slurry so formed with a solution of a compound from the group consisting of alkyl orthophosphates and alkyl pyrophosphates in an organic solvent to form an organic phase containing metal from said group and an aqueous phase substantially free from nickel and cobalt; separating said organic and aqueous phases; and treating said organic phase with acid to form a concentrated aqueous solution containing metal from the group consisting of nickel and cobalt extracted from said organic phase and to reform a solution of the compound from the said group consisting of alkyl orthophosphates and alkyl pyrophosphates in the organic solvent for re-use in treating further hydroxide slurry.

8. A process for treating an aqueous acidic solution containing iron and at least one metal from the group consisting of nickel and cobalt to remove substantially all the iron in the ferric state therefrom and to form a concentrated aqueous solution of metal from said group which comprises treating said aqueous solution at a pH of between 0.5 and 2 with a solution of a compound from the group consisting of alkyl orthophosphates and alkyl pyrophosphates in an organic solvent to form an iron-containing organic phase and a substantially ferric iron-free aqueous acidic phase containing substantially all of said nickel and cobalt in said aqueous solution; treating said iron-containing organic phase with a stripping solution from the group consisting of sodium hydroxide, concentrated hydrochloric acid and a mixture of concentrated hydrochloric acid and concentrated sulfuric acid to remove the iron from said iron-containing organic phase and to reform an organic solution of the compound from the said group consisting of alkyl orthophosphates and alkyl pyrophosphates for re-use in treating further aqueous solution; adding a strong alkali to the substantially ferric iron-free aqueous acidic phase to precipitate substantially all of said nickel and cobalt contained therein as hydroxide; treating the hydroxide slurry so formed with an organic solution of a compound from the group consisting of alkyl orthophosphates and alkyl pyrophosphates to form an organic phase containing metal from the group consisting of nickel and cobalt and an aqueous phase substantially free from nickel and cobalt; separating said organic phase containing said metal and said aqueous phase substantially free from nickel and cobalt; and treating said organic phase containing said metal with concentrated acid to form a concentrated aqueous solution of metal from the group consisting of nickel and cobalt and to reform an organic solution of the compound from the group consisting of alkyl orthophosphates and alkyl pyrophosphates for re-use in treating further hydroxide slurry.

9. A process as described in claim 8 in which the metal-containing organic phase is treated with concentrated hydrochloric acid.

10. A process for treating an aqueous acidic solution containing iron and at least one metal from the group consisting of nickel and cobalt to remove substantially all the iron in the ferric state therefrom and to form a concentrated aqueous solution of metal from said group which comprises treating said aqueous solution at a pH of between 0.5 and 2 with a solution of a compound from the group consisting of alkyl orthophosphates and alkyl pyrophosphates in an organic solvent to form an iron-containing organic phase and a substantially ferric iron-free aqueous acidic phase containing substantially all of said nickel and cobalt in said aqueous solution; adding a strong alkali to the substantially ferric iron-free aqueous acidic phase to precipitate substantially all of said nickel and cobalt contained therein as hydroxide; treating the hydroxide slurry so formed with an organic solution of a compound from the group consisting of alkyl orthophosphates and alkyl pyrophosphates to form an organic phase containing metal from the group consisting of nickel and cobalt and an aqueous phase substantially free from nickel and cobalt; separating said organic phase containing said metal and said aqueous phase substantially free from nickel and cobalt; and treating said organic phase containing said metal with concentrated acid to form a concentrated aqueous solution of metal from the group consisting of nickel and cobalt and to reform an organic solution of the compound from the group consisting of alkyl orthophosphates and alkyl pyrophosphates for re-use in treating further hydroxide slurry.

11. A process for treating a dilute, iron-containing, aqueous solution of nickel and cobalt to remove substantially all the iron in the ferric state therefrom and to form a concentrated aqueous solution of the nickel and cobalt which comprises treating said dilute aqueous solution at a pH of between 0.5 and 2 with a first organic solution of between about 0.5 M and about 2 M di-2-ethylhexyl phosphoric acid in a water-immiscible organic solvent to form an iron-containing organic phase and a substantially ferric iron-free nickel- and cobalt-containing aqueous phase; treating said iron-containing organic phase with a stripping solution from the group consisting of sodium hydroxide, concentrated hydrochloric acid and a mixture of concentrated hydrochloric acid and concentrated sulfuric acid to remove the iron from said iron-containing organic phase and to reform an organic solution of said di-2-ethylhexyl phosphoric acid in said water-immiscible organic solvent for re-use in treating further dilute aqueous solution; adding a strong alkali from the group consisting of sodium hydroxide and potassium hydroxide to said substantially ferric iron-free nickel- and cobalt-containing aqueous phase in an amount sufficient to precipitate substantially all the nickel and cobalt therein as hydroxides but not more than about 1.15 equivalents of alkali for each equivalent of nickel plus cobalt in solution, said equivalents of alkali being in excess of that required to neutralize the free acid in solution; treating the hydroxide slurry so formed with a second organic solution of between about 0.5 M and 2 M di-2-ethylhexyl phosphoric acid in a water-immiscible organic solvent to form a nickel- and cobalt-containing organic phase and an aqueous phase substantially free from nickel and cobalt; separating said nickel- and cobalt-containing organic phase and said aqueous phase substantially free from nickel and cobalt; and treating said nickel- and cobalt-containing organic phase with concentrated hydrochloric acid to form a highly concentrated aqueous solution containing the nickel and cobalt from said nickel- and cobalt-containing organic phase and to reform a solution of said di-2-ethylhexyl phosphoric acid in said water-immiscible organic solvent for re-use in treating further hydroxide slurry.

12. A process as described in claim 11 in which the water-immiscible organic solvent in the first and second organic solutions is n-heptane.

13. A process as described in claim 11 wherein the iron-containing organic phase is treated with a mixture of hydrochloric acid with a normality of between about 4 and about 3 and sulfuric acid with a normality of between about 3 and about 4 to remove the iron therefrom and to form an iron-containing aqueous phase.

14. A process as described in claim 11 wherein the iron-containing organic phase is treated with hydrochloric acid with a normality of between 5 and 10 to remove the iron therefrom and to form an iron-containing acid aqueous phase.

15. A process as described in claim 14 wherein the iron-containing acid aqueous phase is treated for iron removal and recovery of hydrochloric acid with extractants from the group consisting of anionic solvent extractants and anion exchange resins and wherein the iron-containing extractants so formed are regenerated by stripping the iron therefrom with water.

16. A process for treating a dilute iron-containing, aqueous acidic solution of nickel and cobalt to remove substantially all the iron in the ferric state therefrom and to concentrate the nickel and cobalt values which comprises treating said dilute aqueous solution at a pH of between 0.5 and 2 with a first organic solution of between about 0.5 M and about 2 M di-2-ethylhexyl phosphoric acid in a water-immiscible organic solvent to form an iron-containing organic phase and a substantially ferric iron-free nickel- and cobalt-containing aqueous acidic phase; treating said iron-containing organic phase with sodium hydroxide to remove the iron as hydroxide from said iron-containing organic phase and to reform organic solution of said di-2-ethylhexyl phosphoric acid in said water-immiscible organic solvent for re-use in treating further dilute aqueous solution; adding a strong alkali from the group consisting of sodium hydroxide and potassium hydroxide to said substantially ferric iron-free nickel- and cobalt-containing aqueous acidic phase at a ratio of between about 0.9 and 1.15 equivalents of alkali in excess of that required to neutralize free acid in solution for each equivalent of nickel and cobalt in solution to precipitate the nickel and cobalt therein as hydroxides; treating the hydroxide slurry so formed with a second organic solution of between about 0.5 M and about 2 M di-2-ethylhexyl phosphoric acid in a water-immiscible organic solvent at a ratio of between about 0.7 and about 0.9 equivalent of di-2-ethylhexyl phosphoric acid for each equivalent of nickel and cobalt in solution to form a nickel- and cobalt-containing organic phase and an aqueous phase substantially free from nickel and cobalt; separating said nickel- and cobalt-containing organic phase and said aqueous phase substantially free from nickel and cobalt; and treating said nickel- and cobalt-containing organic phase with concentrated hydrochloric acid to remove the nickel and cobalt from said nickel- and cobalt-containing organic phase and to form a highly concentrated aqueous solution of nickel and cobalt and to reform a solution of said di-2-ethylhexyl phosphoric acid in said water-immiscible organic solvent for re-use in treating further hydroxide slurry.

References Cited by the Examiner

UNITED STATES PATENTS

| | | | |
|---|---|---|---|
| 2,757,081 | 7/56 | Hure et al. | 75—101 X |
| 2,831,751 | 4/58 | Birner | 75—119 |
| 2,847,275 | 8/58 | Yeager | 75—101 X |
| 2,869,979 | 1/59 | Grinstead | 23—312 |
| 3,047,361 | 7/62 | Hubbard et al. | 75—121 X |

OTHER REFERENCES

West et al.: Metallurgia, July 1956, pp. 47–51.

BENJAMIN HENKIN, *Primary Examiner.*

DAVID L. RECK, *Examiner.*